April 12, 1932.　　　A. A. HORTON　　　1,853,055
ELECTRIC DRIVE FOR CALCULATING MACHINES
Filed Jan. 24, 1929　　7 Sheets-Sheet 1

INVENTOR
Allen A Horton
BY Rector, Hibben, Davis, &
Macauley
ATTORNEYS

April 12, 1932.    A. A. HORTON    1,853,055
ELECTRIC DRIVE FOR CALCULATING MACHINES
Filed Jan. 24, 1929    7 Sheets-Sheet 2
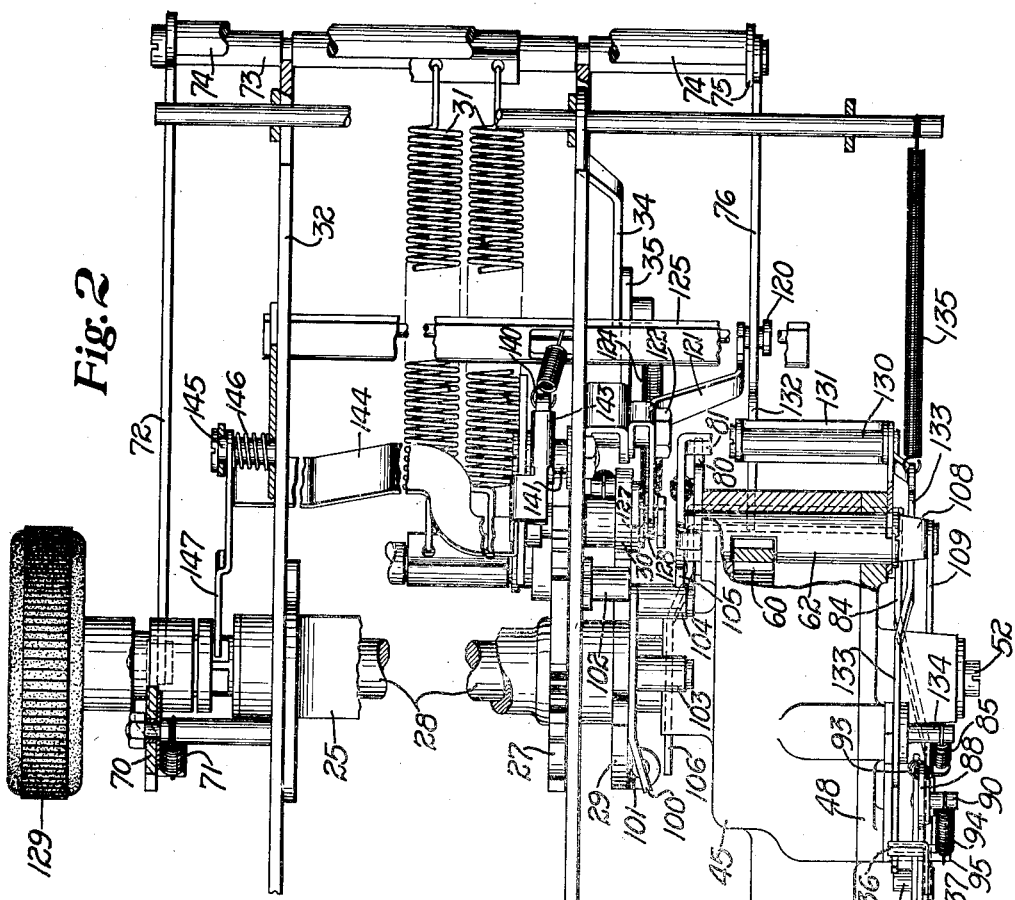
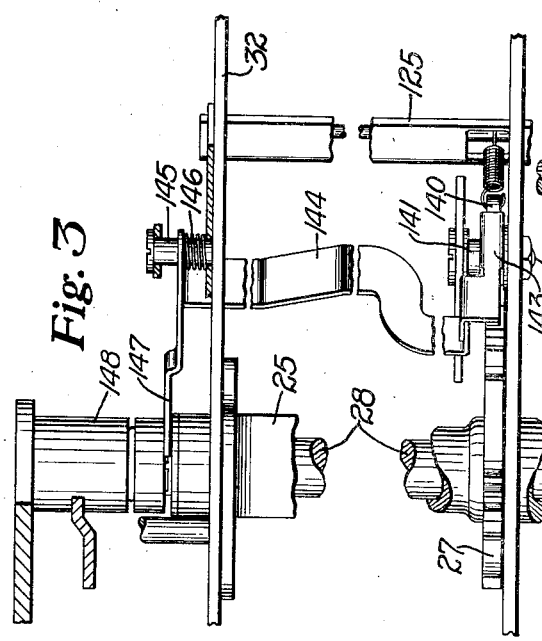
INVENTOR
Allen A. Horton
BY
Rector, Hibben, Davis, & Macauley
ATTORNEYS April 12, 1932.   A. A. HORTON   1,853,055
ELECTRIC DRIVE FOR CALCULATING MACHINES
Filed Jan. 24, 1929   7 Sheets-Sheet 3

INVENTOR
Allen A Horton
BY
Rector, Hibben, Davis, ? Macauley
ATTORNEYS

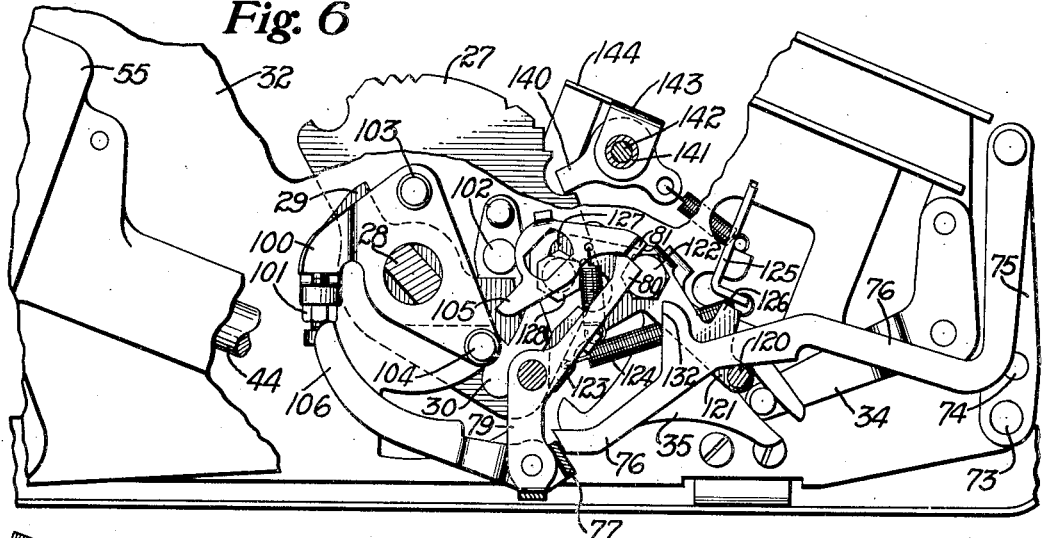
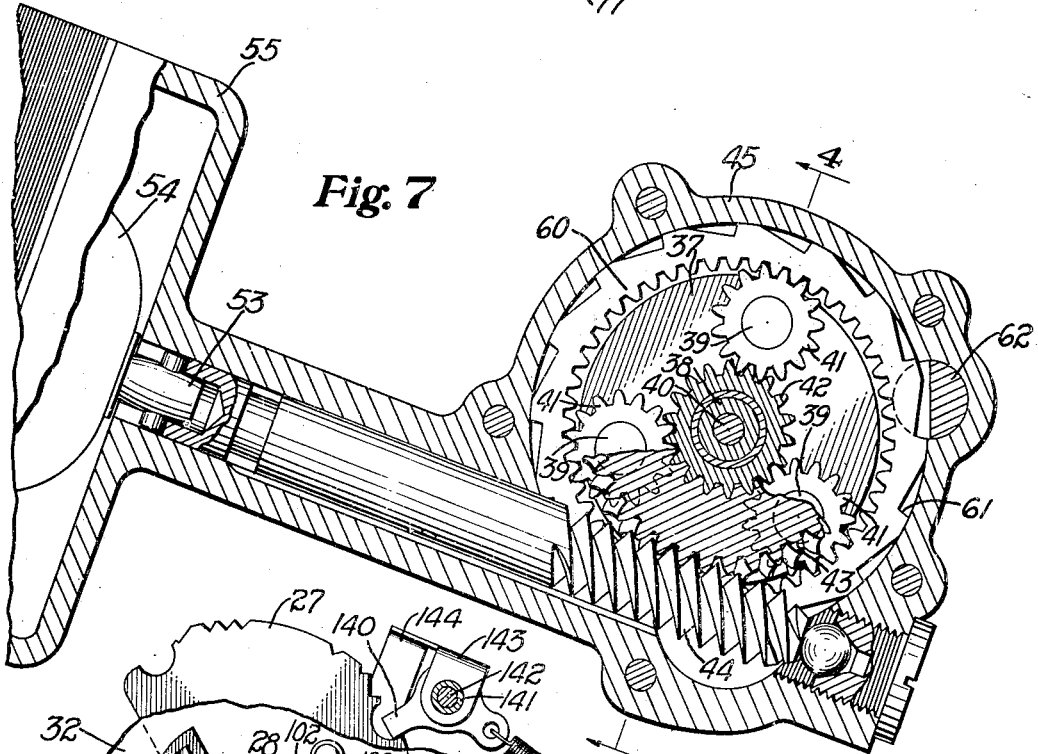
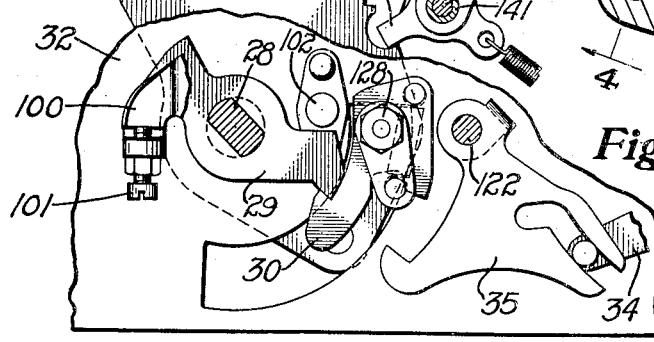

April 12, 1932.  A. A. HORTON  1,853,055
ELECTRIC DRIVE FOR CALCULATING MACHINES
Filed Jan. 24, 1929  7 Sheets-Sheet 5

INVENTOR
Allen A. Horton
BY
Reeter, Hibben, Davis & Macauley
ATTORNEYS

April 12, 1932.  A. A. HORTON  1,853,055
ELECTRIC DRIVE FOR CALCULATING MACHINES
Filed Jan. 24, 1929    7 Sheets-Sheet 6
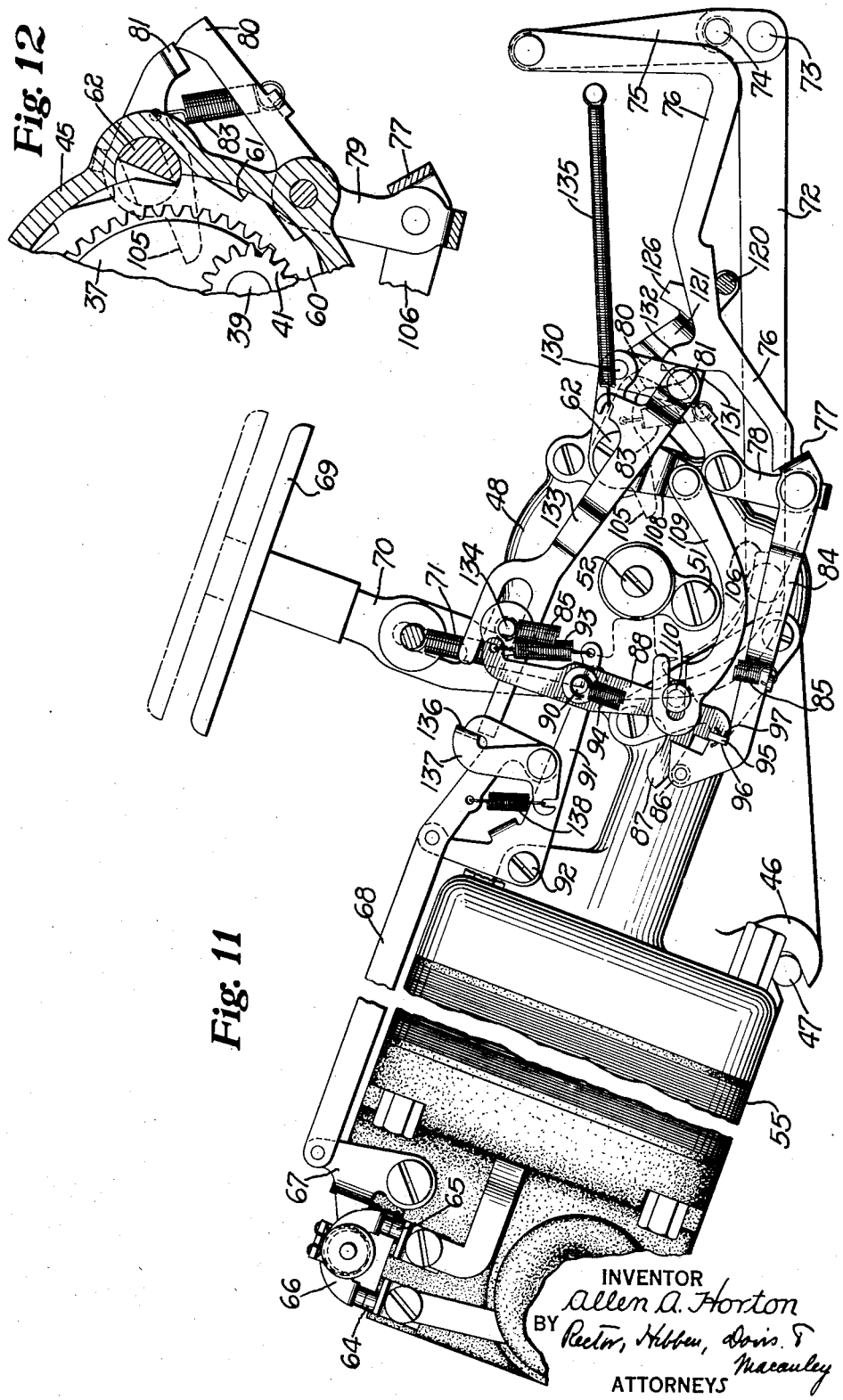
INVENTOR
Allen A. Horton
BY Rector, Hibben, Davis &
Macauley
ATTORNEYS April 12, 1932.  A. A. HORTON  1,853,055
ELECTRIC DRIVE FOR CALCULATING MACHINES
Filed Jan. 24, 1929  7 Sheets-Sheet 7

INVENTOR
Allen A. Horton
BY
Rector, Hibben, Davis, & Macauley
ATTORNEYS

Patented Apr. 12, 1932

1,853,055

UNITED STATES PATENT OFFICE

ALLEN A. HORTON, OF PLYMOUTH, MICHIGAN, ASSIGNOR TO BURROUGHS ADDING MACHINE COMPANY, OF DETROIT, MICHIGAN, A CORPORATION OF MICHIGAN

ELECTRIC DRIVE FOR CALCULATING MACHINES

Application filed January 24, 1929. Serial No. 334,690.

This invention relates to an electric drive for calculating machines.

It is shown applied to a portable calculating machine of the type now on the market known as the Burroughs portable. A great many hand operated machines of this type are already in the possession of users and the present electric drive has been devised so that it may be easily applied to hand operated machines already in use as well as to machines that are being manufactured.

The general object of the invention is to provide an improved electric drive for calculating machines.

A more particular object is to provide a compact and relatively simple drive which may be easily applied to small portable calculating machines without requiring extensive changes in them.

Other objects and advantages of the invention will appear from the following specification and drawings.

An embodiment of the invention is shown in the accompanying drawings in which;

Fig. 2 is a skeletonized plan view of the electric drive and its associated parts.

Fig. 3 is a skeletonized plan view similar to Fig. 2 showing only a portion of the driving mechanism and particularly that portion which illustrates how the full stroke pawl is controlled by the hand operated crank when the latter is put in place.

Fig. 6 is a left side elevation of the electric drive with the gear case broken away to show some of the parts that are hidden by it in the other views.

Fig. 7 is a cross-sectional view of the gear case taken at right angles to the section of Fig. 4 on the line 7—7 of Fig. 4.

Fig. 8 is a fragmentary sectional elevation showing how the drive shaft is connected to the full stroke sector.

Fig. 11 is a left side elevation of the electric drive with the gear case broken away and with the parts in the position they occupy when the motor bar is depressed.

Fig. 12 is a fragmentary cross section similar to Fig. 7 showing in detail the control for a portion of the planetary gear mechanism contained within the gear case.

As previously mentioned, the invention is shown applied to a Burroughs portable machine, the general construction of which is well known as the machine has been on the market for some time. An understanding of the details of this calculating machine is not necessary for an understanding of the present invention and the mechanism will be described only briefly. It is to be understood that the electric drive is not confined to use with the Burroughs portable machine, but may be used with any other suitable type of calculating machine adapted to be driven by power.

Figure 1:
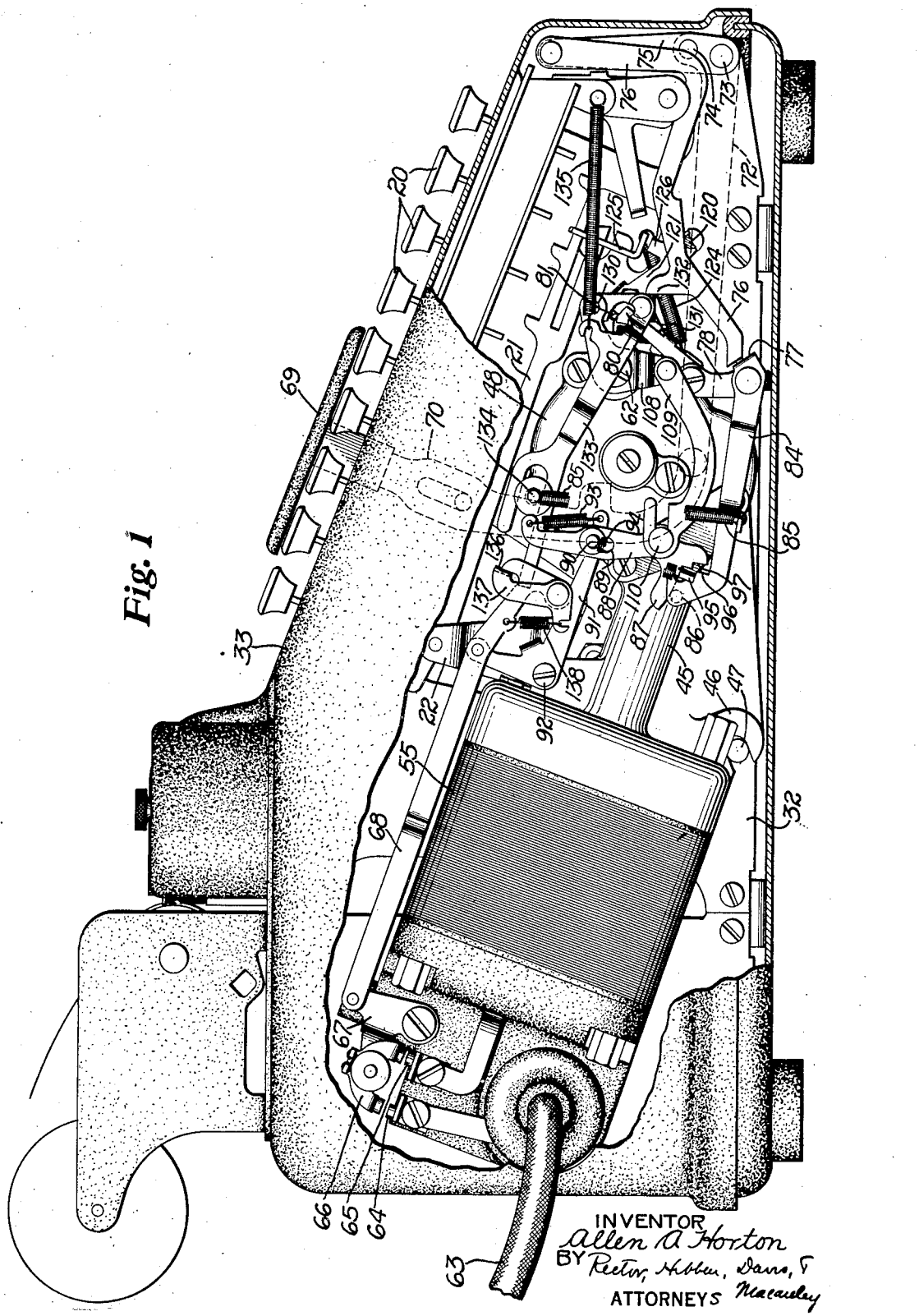
Figure 1 is a left side elevation of a calculating machine with the electric drive applied thereto, the casing being broken away to show the parts of the driving mechanism.
Figure 13:
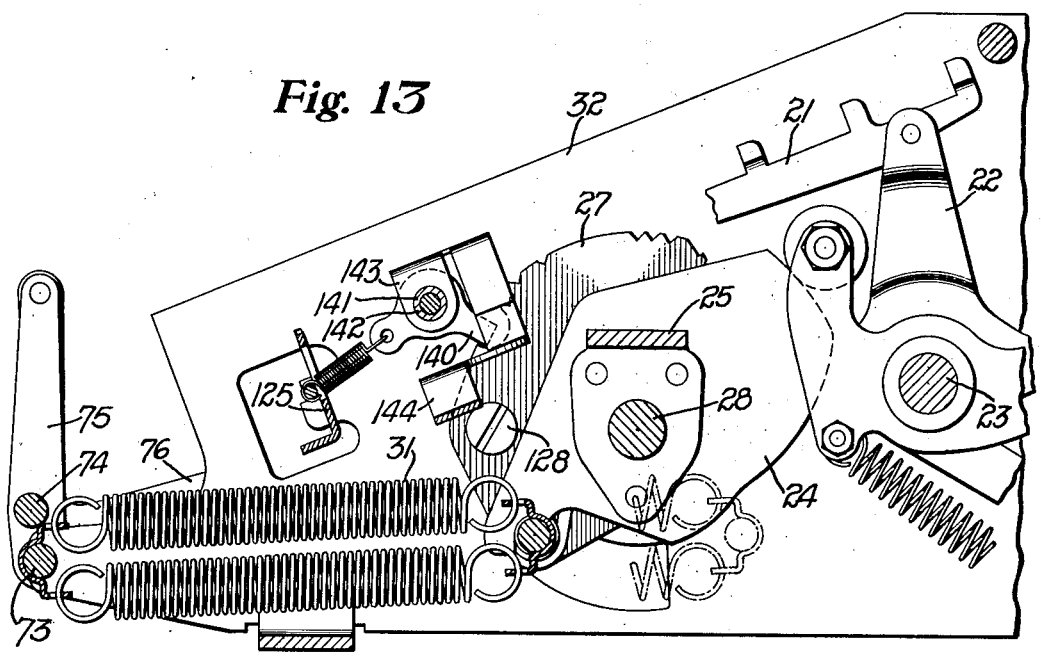
Fig. 13 is a right side elevation and section of the opposite side of the machine with the right side frame removed to show the full stroke sector and associated parts.

The calculating machine includes a plurality of amount keys 20 which control differential stop bars 21 (Fig. 1). These stop bars are connected to arms 22 (Fig. 13) of actuator racks, not shown, the actuator racks being pivoted on a shaft 23 and being controlled by a cam plate 24. The cam 24 is fixed to a yoke 25 that is yieldingly connected through a spring 26 to a full stroke sector 27. This full stroke sector is loosely journaled on a drive shaft 28 and it is rocked by said shaft by means of an arm 29 (Figs. 6 and 8) that normally engages a hook-shaped pawl 30 carried by the full stroke sector. During the forward stroke of the machine, the drive shaft 28 is rocked counterclockwise as viewed in Fig. 13 which rocks the full stroke sector with the yoke 25 in the same direction. At the end of the forward stroke the drive shaft is released and the springs 31 (Fig. 13) return the yoke 25 and cam plate 24 clockwise to normal position. The drive shaft 28 is journaled in frame plates 32 which support various other parts of the machine, the entire mechanism being enclosed in a casing 33 as illustrated in Fig. 1.

The machine is provided with a safety mechanism for preventing its operation when it has not been properly conditioned for operation. Said mechanism operates to disconnect the driving means from the operating mechanism of the machine whenever the machine is not properly conditioned. For example, if an amount key is depressed at the same time that the total key is depressed and an attempt is made to operate the machine, the driving means will be automatically disconnected from the operating mechanism as the operating mechanism starts to move and before it has moved any substantial distance. Referring to Figs. 2, 6 and 8 the machine is provided with an arm 34 (Fig. 2) that is controlled by the condition of the machine and this arm controls a pawl 35 that acts to disconnect the pawl 30 on the full stroke sector 27 from the arm 29 when the machine is not properly conditioned for operation. The details of this mechanism are not illustrated in the present application as an understanding of them is not necessary for an understanding of the present invention, it being sufficient to know that such mechanism is present in the Burroughs portable machine to which the electric drive of the present application is applied.

Figure 4:
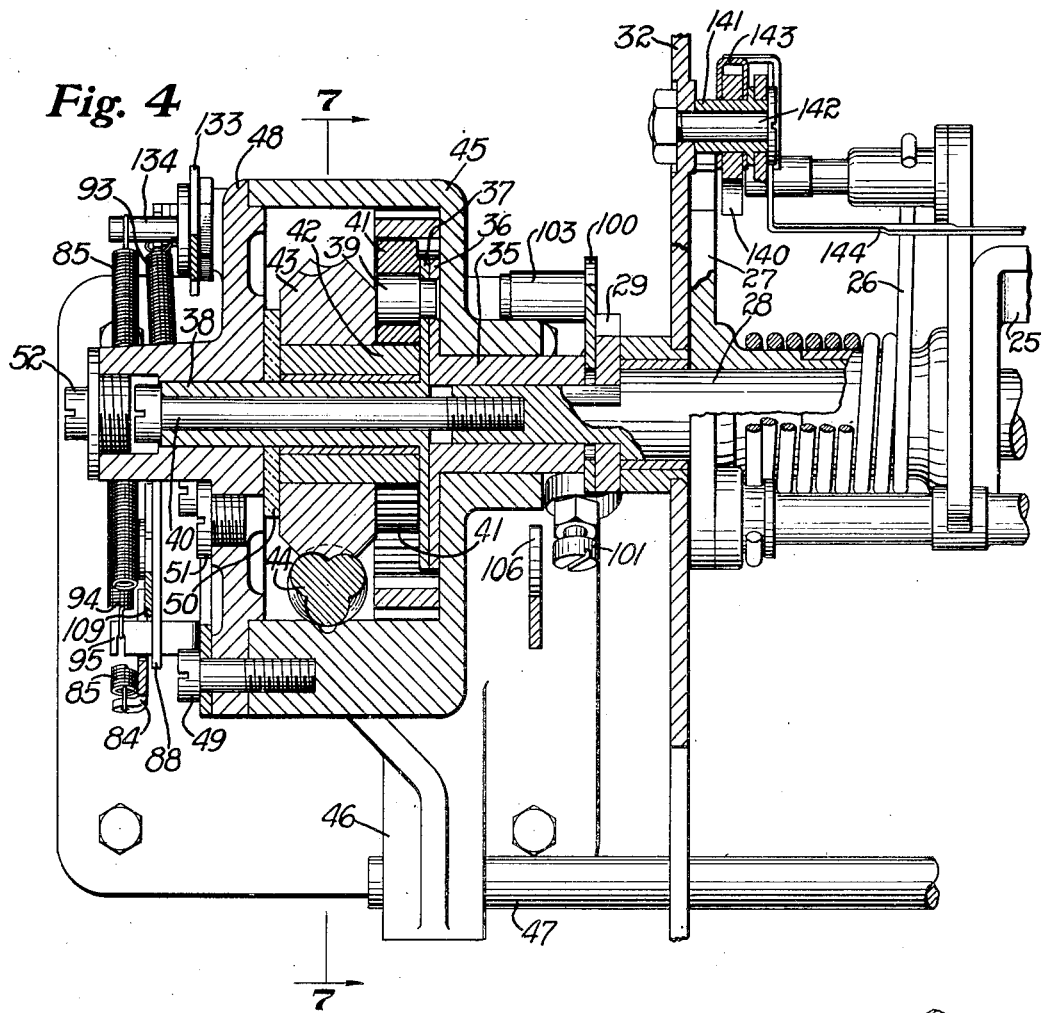
Fig. 4 is a cross-sectional view of the gear case and the parts connected to the main shaft of the calculating machine, the view being taken on the line 4—4 of Fig. 7.
Figure 5:
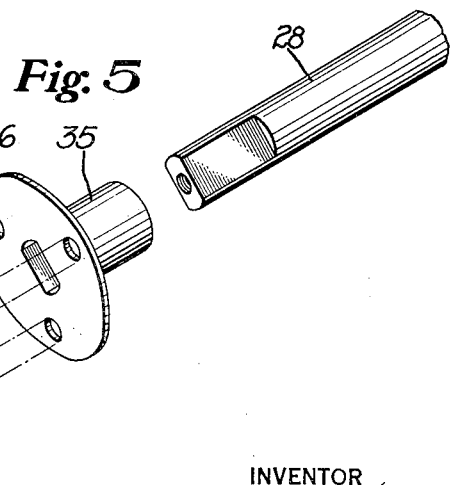
Fig. 5 is a separated perspective view of the portion of the electric drive connected directly to the main shaft of the calculating machine.

The electric drive is connected directly to the main shaft 28 of the machine as will be clear by reference to Fig. 4. The outer end of the shaft 28 is flattened as illustrated in Fig. 5 and, fitting over this flattened end is a sleeve 35 having an opening in it corresponding in shape to the flattened end of shaft 28 so that the sleeve will rotate with the shaft. The outer end of the sleeve 35 carries a disk 36 having three holes in it and, abutting against it, is a companion disk 37 carried by a sleeve 38. The two disks 36 and 37 are connected together by three rivet studs 39 on which are journaled planet gears that will be described later. The two disks 36 and 37 are held in position on the shaft 28 by means of a bolt 40 illustrated in Fig. 4.

Journaled on the studs 39 are three planet gears 41 all of which mesh with a central sun gear 42 journaled on the sleeve 38, said sun gear being integral with a worm wheel 43 driven by a worm 44.

A casing or gear box 45 encloses the gears just described, said casing being journaled at its inner end on the sleeve 35 and being prevented from rotating by an extension 46 fitting over a stationary shaft 47 on the machine. The gear case is closed by a cover or a cap plate 48 which is held in position by suitable bolts 49, said cover plate holding the worm 43 in place by means of a washer 50 interposed between said parts and said cover as illustrated in Fig. 4. A screw 51 closes an oil or grease opening in the cover plate into which oil or grease may be inserted so as to enable the gears to run in the proper kind of lubricant. A cap screw 52 covers the opening in the cap 48 which accommodates the bolt 40.

The worm 44 is driven through a universal joint 53 (Fig. 7) by a small electric motor 54 contained within a housing 55 as illustrated in Fig. 7, the motor being supported in floating condition by the cross shaft 47 and shaft 28 (Fig. 1). This is one of the important improvements in that it lessens friction on the drive shaft and prevents warping of the motor relative to the frame of the machine.

Figure 10:
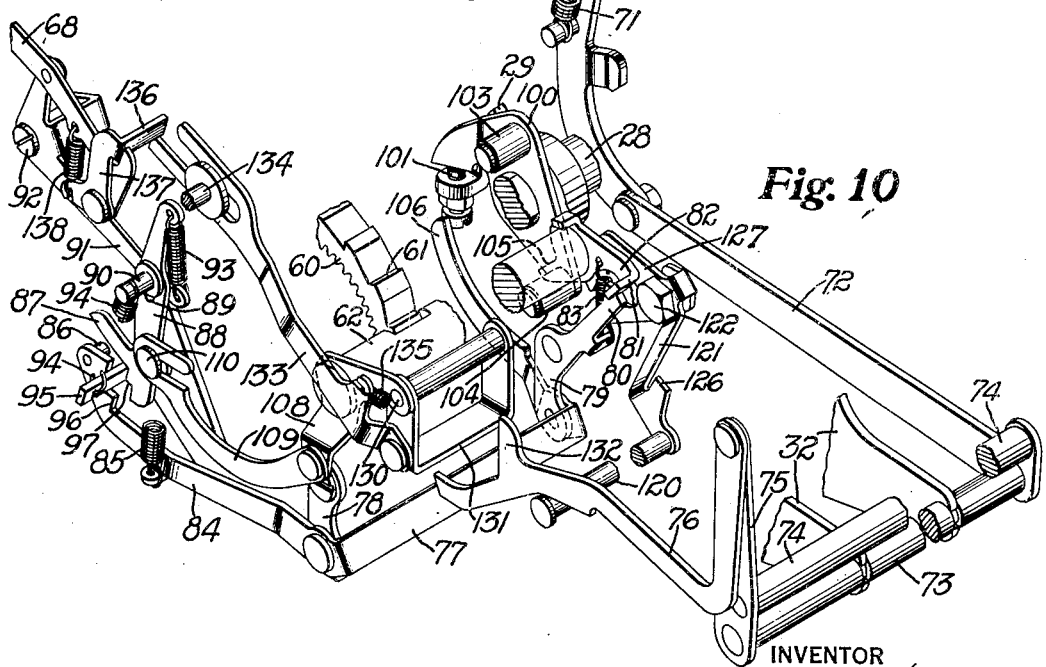
Fig. 10 is a perspective view of the controlling connections for the electric drive.

Journaled within the gear case 45 is an annular internal gear 60, the teeth on its inner edge meshing with the planet gears 41 (Fig. 7). The outer periphery of this gear has a plurality of notches 61 formed in it and, journaled in the housing 45 in a position to engage these notches, is a shaft 62 having a portion of semi-circular cross section as illustrated in Figs. 7 and 10. When this shaft is turned from the position of Fig. 7 to that of Fig. 12 one of the edges of the semi-circular portion enters one of the notches 61 in the gear 60 thereby blocking the gear against rotation in a counterclockwise direction.

The electric motor thus drives the calculating machine through a planetary gear transmission. Referring to Fig. 7, the worm shaft 44 is rotated clockwise by the motor which causes the sun gear 42 to rotate clockwise and it, in turn, rotates the planet gears 41 counterclockwise. If the internal gear 60 is free to rotate, the rotation of the planet gear 42 merely results in the rotation of gear 60 and there is no driving action on the calculating machine. However, if the gear 60 is blocked against rotation by the half round shaft 62, the planet gears 41 rotate around the inner edge of the gear 60 and carry the disks 37 and 36 with them thereby rocking the sleeve 35 and the drive shaft 28 clockwise as viewed in Fig. 6.

The power for driving the motor is led to the motor through conductors 63 (Fig. 1) that enter the side of the casing, a suitable opening being made for them. One side of the power circuit is interrupted, said side ending in a contact 64 which is separated from a similar contact 65. These two contacts may be electrically connected by a switch 66 carried on a rearwardly projecting arm of a pivoted lever 67 controlled by a reciprocating link 68. The switch normally occupies the position shown in Fig. 1. When the link 68 is pushed rearwardly the switch is moved to the position of Fig. 11 to close the circuit and energize the motor.

Figure 14:
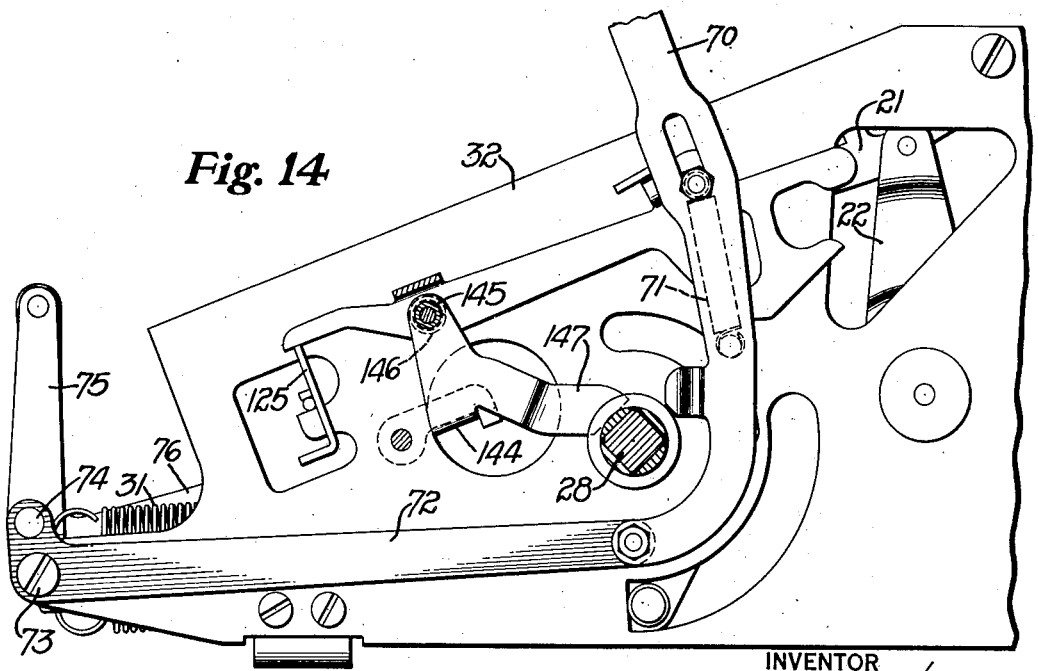
Fig. 14 is another right side elevation and section showing the parts on the outside of the right hand side frame of the machine, particularly the connections operated by the motor bar.

In order to operate the calculating machine, it is not only necessary to close the switch to start the motor but also to move the semicircular shaft 62 to a position where it will block the gear 60. This is done by means of a motor bar 69 (Fig. 11) which may be depressed from the dot and dash to the full line position of Fig. 11. Referring to Figs. 14 and 10 the motor bar is connected to a slidable link 70 urged upward by a spring 71. This link is pivotally connected at its lower end to one arm of a bell crank lever 72 (Fig. 10) pivoted on a cross shaft 73 supported in the side frame plates 32 at the front of the machine. The other arm of this bell crank lever is connected to a shaft 74 (Fig. 9) extending across the front of the machine and connected to an arm 75. The arm 75 is pivoted on the shaft 73 and it carries an elbow lever 76 which is pivoted to it. The lever 76 will be referred to as the starting lever.

From the above description it will be apparent that, when the motor bar is depressed, the bell crank 72 is rocked counterclockwise as viewed in Fig. 10 and the lever 76 is thrust rearwardly, or to the left as viewed in Fig. 10.

The shaft 62 is turned to block the gear 60 by the engagement of the rear end of the lever 76 with a yoke 77 carried by two pivoted arms 78 and 79, the arm 79 having an extension 80 normally engaging under a lateral lug 81 on an arm 82 fixed to the shaft 62. The arm 79 with its extension 80 is urged counterclockwise as viewed in Fig. 10 by a spring 83 to normally maintain the extension 80 under the lug 81 on arm 82 and to urge the yoke 77 to normal position. The spring 83 also urges the arm 82 clockwise.

It will be apparent that, when the motor bar is depressed and the starting lever 76 moved rearwardly, the lower rear end of said lever 76 will engage the yoke 77 and rock the arm 79 clockwise, thereby releasing the arm 82 whereupon the spring 83 will move said arm clockwise and rotate the shaft 62 clockwise from its normal position to the position illustrated in Fig. 12. In this manner the shaft 62 is turned to a position to block the gear 60 when the motor bar is depressed.

In order that depression of the motor bar may also close the switch to start the motor, the yoke 77 is provided with a rearwardly extending arm 84 (Fig. 10) urged in a clockwise direction by a spring 85. The rear end of the arm 84 carries a stud 86 which, when the arm is rocked clockwise, engages a projection 87 on a pawl 88 having a slot 89 engaging over a stud 90 on one arm of a bell crank lever 91 pivoted at 92 and connected to the link 68. The pawl 88 is yieldingly connected to the bell crank lever 91 by a spring 93 which tends to rock the pawl 88 clockwise on its pivot 90. The bell crank 91 is urged clockwise by a spring 94 connected at one end to the stud 90 and at its other end to a stationary lug 95 (Fig. 1). It will be observed that the rear end of the arm 84 is stepped at 96 and the lower end of the pawl 88 is stepped at 97. The above parts operate as follows:

When the motor bar is depressed, the lever 76 moves rearwardly, the bail 77 swings about the pivots of the arms 78 and 79, and the arm 84 moves rearwardly. When the shoulder 96 passes to the rear of lug 95, the spring 94 snaps the arm 84 upward from the position of Fig. 1 to that of Fig. 11 where it is latched behind lug 95. As the arm 84 moves upward the stud 86 engages the tail 87 of pawl 88 and moves the pawl upward, the movement being transmitted through the spring 93 to the bell crank 91 which is rocked counterclockwise to thrust the link 68 rearward to close the switch. The tension of spring 93 overcomes that of spring 94 in effecting this movement. As the pawl 88 moves upward the spring 93 swings it clockwise to cause the shoulder 97 to pass over the stationary lug 95 as illustrated in Fig. 11.

The above described movement of the parts closes the motor switch, and the latching of the shoulders 96 and 97 over the stationary lug 95 holds the controlling connections in the positions to which they have been moved, thereby insuring that the switch will remain closed.

It will thus be clear that, when the motor bar is depressed, two operations take place, to-wit, the semi-circular shaft 62 is rocked so as to block rotation of the gear 60 and the motor switch is closed. The timing is such that the lug on arm 82 is released from on top of the latch 80 just in advance of the circuit being closed at the contacts 64—65 in order that the shaft 62 will be rocked and rotation of gear 60 blocked before the motor switch is closed.

In order to operate the machine it is not desirable that the drive shaft be completely rotated but that it merely be rocked far enough to complete the forward stroke of the machine after which it is desirable that the motor drive be disconnected so that the springs 31 may act to return the calculating machine mechanism to its original position. It is, therefore, desirable to disconnect the motor drive from the calculating machine at the end of the forward stroke of the latter and to stop the motor. Mechanism has been provided for accomplishing this result automatically, such mechanism being under the control of the drive shaft of the calculating machine.

Referring to Figs. 4 and 10, a plate 100 is provided which is clamped between the sleeve 35 and the arm 29 so as to move with the shaft 28. Arm 29 and plate 100 thus move as a unit but the plate 100 may be adjusted relative to arm 29 by an adjusting stop 101. Both the clockwise and the counterclockwise rocking of plate 100 and arm 29 are arrested by a stud 102 which engages the edges of arm 29. The plate 100 carries an upper stud 103 and a lower stud 104. During the forward stroke of the machine the plate 100 rocks clockwise and, near the end of the forward stroke, the stud 103 strikes the tail 105 (Fig. 6) of the latch 82 thereby raising the latch against the tension of the spring 83, the tension of said spring tending to return the arm 79—80 to position under the lateral lug 81 on the latch 82, that is, to return the parts to the position illustrated in Fig. 10. Near the end of the forward stroke the stud 104 engages a curved arm 106 which is an extension of the yoke 77 and the stud thereby rocks the yoke counterclockwise while the latch 82 is raised. This action together with that of spring 83 rocks the detent arm 79—80 to a position such that its end is beneath the lug 81 on latch 82. The movement of the latch 82 to normal rotates the semicircular shaft 62 back to normal so as to free the gear 60 thereby disabling the driving connection between the motor and the calculating machine. Accordingly, even though the motor may continue to rotate it will no longer drive the machine.

The counterclockwise motion imparted to the arm 106 by stud 104 also rocks the arm 84 counterclockwise from its Fig. 11 to its Fig. 10 position, which disengages it from the stationary lug 95, the arm 84 being urged clockwise by the spring 85. The stud 86 on arm 84 moves away from the tail 87 on the pawl 88 so as to free said pawl for movement back to normal. It will be recalled, however, that the pawl 88 is latched over the lug 95 as illustrated in Fig. 11 and it cannot move back to normal unless it is rocked counterclockwise to release it from the lug. This releasing movement is obtained by means of a bell crank 108 which is fixed to the shaft 62. The lower arm of this bell crank has a link 109 connected to it having a slotted rear end engaging over a stud 110 on the pawl 88 as illustrated in Fig. 10. When the shaft 62 is rocked counterclockwise to normal as previously explained, the link 109 which had previously been moved rearward is pulled forwardly which results in pulling the pawl 88 off the lug 95 to free it for downward movement. As soon as the pawl 88 is free the spring 94 acting on the stud 90 rocks the bell crank lever 91 clockwise which moves pawl 88 downward to normal and pulls the link 68 forward to open the switch.

In the normal position of the parts shown, for example, in Fig. 10, the link 109 would prevent the pawl 88 from moving to latched position when the motor bar is depressed were it not for the fact that, when the motor bar is depressed, the shaft 62 moves clockwise and thrusts link 109 rearward to release pawl 88.

In this manner the parts above described act near the end of the forward stroke of the machine to automatically cause the shaft 62 to be moved to normal to disable the planetary transmission and to simultaneously open the switch to de-energize the motor, the planetary transmission and the controlling connections for starting the motor, including the yoke 77, being also returned to normal for a new operation.

It should be noted that the planetary transmission is an oscillatory one. As far as known, all prior transmissions of this type have operated continuously in one direction.

*Preventing repeat operations when motor bar is held depressed*

Figure 9:
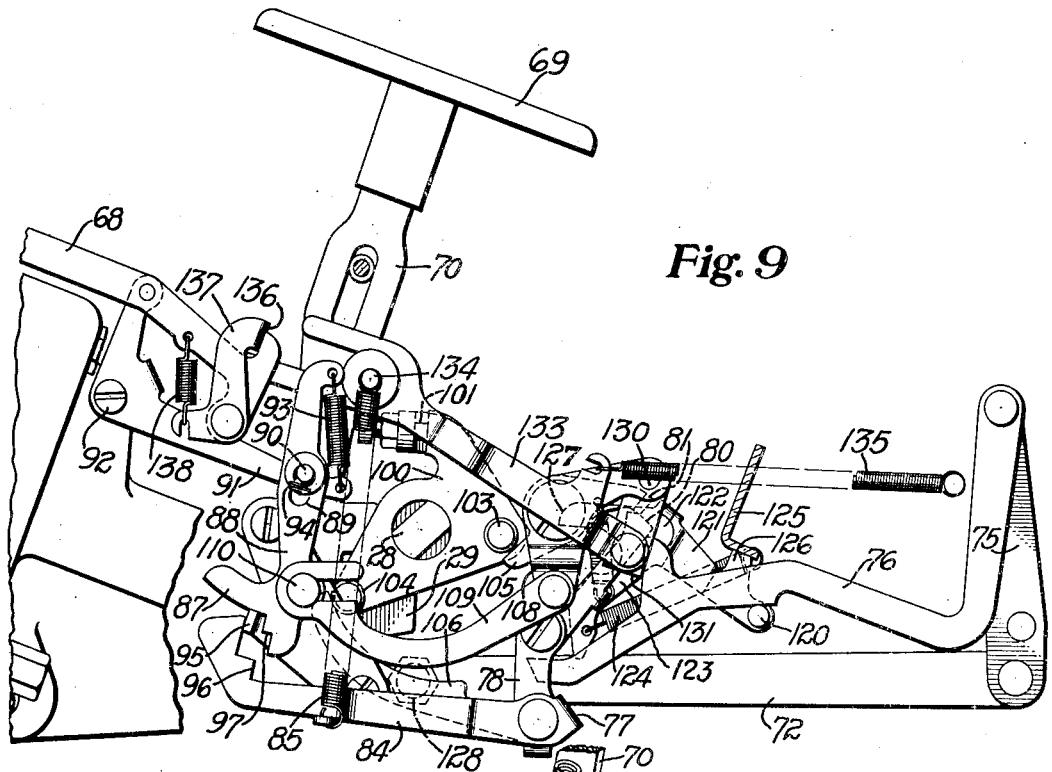
Fig. 9 is a left side elevation of the electric drive with the gear case broken away, the view being similar to Fig. 6, except that the parts are in the position they occupy at the end of the forward stroke of the main shaft of the calculating machine.

It is generally desired to give the machine only one stroke of operation when the motor bar is depressed, but it could easily happen that an operator would hold the bar depressed longer than necessary in which event it is desired that the machine be given only one stroke of operation regardless of how long the bar is held down. Mechanism is provided for this purpose as follows:

When the starting lever 76 is moved rearward by depression of the motor bar it slides up over the yoke 77 after it has moved the yoke to starting position. As soon as the machine starts to operate the lever 76 is moved farther upward and held in upward position by a stud 120 carried on one arm 121 (Fig. 6) of a three-armed lever pivoted at 122. The rear arm 123 (Fig. 9) of this three-armed lever has one end of a spring 124 connected to it, the other end of said spring being connected to a cross plate 125 of the machine. The spring thus urges the three-armed lever counterclockwise, its counterclockwise movement being limited by the engagement of a stop 126 on the arm 121 with the cross plate 125 (Fig. 9.)

The three-armed lever is normally held in the position illustrated in Fig. 6 by a third arm 127 which is engaged by a stud 128 on the full stroke sector 27. When the machine starts to operate the full stroke sector 27 rocks clockwise from the position of Fig. 6 which releases the arm 127 whereupon the spring 124 rocks the three-armed lever counterclockwise until the stop 126 engages the cross member 125. This movement of the three-armed lever raises the stud 120 and the link 76 to the position illustrated in Fig. 9 where, it will be observed, the lever 76 is above the yoke 77 and out of operative connection with it. The stud 120 is not moved downwardly until the full stroke sector returns to normal near the end of the return stroke of the machine, whereupon the stud 128 engages the arm 127 and rocks the three-armed lever back to its normal position. This releases the starting lever 76 for movement to normal but, if the motor bar is still depressed, this arm is still projected rearwardly above the yoke 77 and the starting lever is ineffective to move the yoke until the motor bar has been released to permit the starting lever 76 to return forward to normal so as to drop down in front of the yoke 77. The controlling connections including the yoke 77 are, therefore, free to move back to normal irrespective of how long the motor bar is held depressed but they cannot be operated to cause the second operation of the machine unless the motor bar is released and depressed a second time. Accordingly, there is no danger of the machine operating more than once in the event the motor bar is held down too long.

*Operation when calculating machine is automatically disconnected due to not being properly conditioned for operation*

As previously explained the calculating machine is provided with a mechanism for automatically disconnecting the drive shaft from the full stroke sector when the machine is not properly conditioned for operation; as, for example, when an amount key and a total key are depressed at the same time. In this event the parts of the calculating machine mechanism (the full stroke sector, etc.) that have been partly operated are returned to normal by the springs 31, but the drive shaft 28 is free to rotate clockwise. The motor continues to operate as usual, the shaft 62 is returned to normal at the end of the forward stroke of the drive shaft 28 and the switch is opened at the same time but, because the drive shaft 28 is now disconnected from control by returning springs 31 and is in its full clockwise positon, the machine cannot be again operated until the drive shaft has been returned. Manual means are provided for this purpose comprising a removable hand twirler 129 on the drive shaft 28. When the knob 129 is rotated counterclockwise, after a disabling operation, it restores the shaft 28 including the plate 100 and arm 29 to normal. At the same time the stud 104 on plate 100 releases the arm 106, yoke 77 and arm 84, so that they return to normal position ready for the next operation.

*Insuring proper operation when motor bar is given a quick short depression or tap immediately following a preceding operation*

After entering an item and while the motor is still coasting or running idly, an operator may, in fast operation of the machine, depress the keys for a succeeding operation and also depress the motor bar very quickly, but not fully in the second operation, that is; he may give it a sharp blow which does not result in as complete depression of the motor bar as is desirable in order to operate the controlling connections. This depression may be enough to position the semi-circular shaft 62 to connect the planetary transmission for operation, but not enough to close the switch. The motor might be, and usually is, still running under momentum from the preceding operation, in which event the machine might be operated slightly, at least, the full stroke sector might be moved far enough to cause the stud 120 to disable the starting lever 76.

On attempting to depress keys for a third operation the operator discovers that the keyboard is locked against depression (by interlocking devices not shown because unnecessary in this case). This locking of the keys warns the operator that he has not fully depressed the motor bar in the second operation and that, in order to register the amount set up in the second operation, it is necessary to complete the partly completed second operation. With the mechanism thus far described, it might be necessary to remove the casing from the machine and close the circuit manually by depressing the switch bar 66.

Referring to Fig. 10, assume, for example, that in the second operation of the machine, the operator taps the motor bar immediately after the machine has been operated and before the motor has stopped running. Assume also that this depression has been enough to free the arm 79—80 from the latch 82 so that the semi-circular shaft 62 is moved to position to lock the gear 60 but the arm 84 has not been moved rearwardly far enough to release it from the lug 95 so that, while the planetary transmission has been conditioned to drive the machine, the circuit of the motor has not been closed. However, owing to the motion of the motor under momentum from its prior operation, operation of the machine is started far enough to cause the full stroke sector 27 to release the three-armed lever 121 that controls the stud 120 so that the starting lever 76 is disabled and is positioned above the yoke 77. With the parts in this condition, if the motor bar were depressed no action would result because the starting lever 76 would not contact the yoke 77. In order to permit an operator to complete the partly completed operation without closing the circuit manually, the following mechanism is provided.

Pivoted on a stud 130 carried by one arm of the bell crank lever 108 that is fixed to the semi-circular shaft 62 is a yoke 131 positioned to be engaged by an upstanding projection 132 on the starting lever 76. Pivoted to this yoke is a rearwardly extending arm 133 having a slot in its rear end engaging over the stationary stud 134. The arm 133 is urged clockwise by a spring 135 illustrated in Fig. 9.

The rear end of the arm 133 is normally beneath a lug 136 on a yielding bell crank lever 137 urged clockwise by a spring 138. When the motor bar is partially depressed under the conditions assumed above, the starting lever 76 is moved rearward, the shaft 62 rocks clockwise, and the yoke 131 moves down, the spring 135 pulling link 133 and yoke 131 forward into contact with the lug 132 on starting lever 76. The forward movement of link 133 is sufficient to free its rear end from beneath the lug 136 and the slot in the rear of the link is enough wider than stud 134 to permit spring 135 to rock the link 133 on its pivot to position the end of the link in front of the lug 136.

When the motor bar is depressed to complete the partly completed operation under the conditions assumed above, the starting lever 76 is moved rearward and, because its lug 132 engages the yoke 131, said yoke will be rocked clockwise and move the link 133 rearward and, because the rear end of link 133 is in front of the lug 136, the link 68 will be moved rearward to close the circuit to energize the motor. The arm 84 will not be operated at this time to close the circuit because the rear end of the starting lever 76 is above the yoke 77. It is to be remembered that, at the end of the partly completed operation, the half round shaft 62 had been rocked into position to engage a notch 61 of the ring gear 60 and the bell crank lever 108 had been rotated clockwise to its fullest extent with the half round shaft 62. Closing the circuit causes the machine to complete its operation and in doing so the stud 103 engaging the lug 105, as in Fig. 9, rocks the shaft 62 counterclockwise and the bell crank lever 108 correspondingly. The yoke 131 being held against the perpendicular rear face of the lug 132 by the spring 135, follows the front end of the bell crank 108 in its upward movement and, because the link 133 pivots about the stud 134, the link 133 rocks counterclockwise sufficient to cause its rear end to move from in front of the lug 136 and to a position beneath said lug. The spring 94 connected to the bell crank lever 91 will then rock said bell crank lever 91 clockwise to move the link 68 rearward to break the circuit and position the lug 136 over the rear end of the link 133 as in normal condition. This all occurs at the end of the forward stroke with the stud 103 engaging the lug 105 to rock the arm 82 and, consequently, the shaft 62 counterclockwise to free said shaft from the notches 61 of the internal gear 60. When this occurs the spring 83 rocks the arm 79—80 counter clockwise to a position beneath the lug 81.

As previously stated, the rear end of the link 133 is normally beneath the lug 136. To insure that the rear end of the link 133 will move in front of the lug 136 under the conditions above described, the slot in the rear end of said link is made wider than the diameter of the stud 134. Normally the spring 135 holds the lower fork of the link 133 against the stud 134. Consequently if the slot were the same width as the diameter of the stud 134, the clockwise movement of the link 133 about the stud 134 as a pivot might lock the rear end of the link 133 beneath the lug 136 before the link 133 had moved sufficiently forward as the yoke 131 descends against the rear face of the lug 132. In order to prevent this condition, the slot is made wider with the result that, as the yoke 131 descends, the lower fork of the slot in link 133 will move away from the stud 134 and will be snapped back in position against the stud 134 by the spring 135 when the rear end of the link 133 clears the lug 136. This movement under control of the spring 135, combined with the clockwise movement of the link 133, positions the rear end of the link 133 behind the lug 136 in readiness to push the link 68 rearward when the motor bar is depressed to complete the already partially completed stroke.

When the arm 133 moved rearward to close the circuit as above described, the bell crank 91, was not only moved rearward but it was also moved counterclockwise. This elevated the pawl 88 to permit its shoulder 97 to engage over the lug 95 through the tendency of the spring 93 to urge said arm clockwise. This insures the circuit remaining closed until the completion of the full forward stroke. When the bell crank 108 is rocked counterclockwise with the half round shaft 62 at the end of the forward stroke the link 109 is moved forward and it releases the shoulder 97 from engagement with the lug 95. The spring 83, in restoring the arm 79—80, also restores the yoke 77 and arm 84 to normal Fig. 1 position.

At practically the end of the return stroke the stud 128 on the full stroke sector engages the extension 127 to return the three armed lever 121 clockwise to its Fig. 6 position and permit the rear end of the starting lever 76 to assume its normal position in front of the yoke 77.

In the ordinary depressions of the motor bar, the projection 132 on starting lever 76 contacts yoke 131 to move link 133 rearwardly but this is an idle operation as far as closing the circuit is concerned because link 133 is beneath the lug 136 and the starting arm 76 almost immediately picks up the yoke 77 to close the circuit by means of arm 84. In such event the link 68 is thrust rearward by the arm 84 and the connections between it and link 68, the link 133 moving rearward also due to the action of projection 132 on yoke 131.

*Automatic control of full stroke pawl*

When the machine is being motor operated it is not desirable to have the full stroke pawl operative and a mechanism has been provided for automatically disabling the full stroke pawl when the machine is conditioned for motor operation.

Referring to Figs. 4 and 6 it will be observed that a full stroke pawl 140 is rockably mounted on a bushing 141 on a stud 142 carried by the side frame 32. The pawl is positioned between the arms of a yoke 143 by means of which it may be slid along bushing 141 into and out of alignment with the full stroke sector 27. In Fig. 4 the full stroke pawl is shown out of the path of the full stroke sector 27, but it may be moved to the left as viewed in Fig. 4 and into operative relation with said full stroke sector. The yoke 143 has a controlling bar 144 connected to it, said bar extending across the machine as illustrated in Fig. 3. The bar 144 has its outer end bent upward and provided with an opening for receiving a stud 145 on one of the frame plates 32. A spring 146 is interposed between the upturned end of the bar 144 and the frame plate 32, said spring serving to urge the bar 144 toward the right hand side of the machine or to the right in Fig. 4. Accordingly, the full stroke pawl 140 is normally urged to disabled position. Referring to Figs. 3 and 14, it will be observed that the controlling bar 144 has a projection 147 which extends to a point adjacent the shaft on which the hand crank 148 is mounted. When the hand crank is placed on the machine in the position illustrated in Fig. 3, it contacts the lateral projection 147 and forces the bar 144 across the machine to position the full stroke pawl in operative relation to the full stroke sector. Accordingly, whenever the hand crank is put on the machine the full stroke pawl is enabled, but as soon as this hand crank is removed the spring 146 moves the bar 144 and disables the full stroke pawl.

When the machine is conditioned for motor operation the knurled knob 129 is put on the end of the shaft 28 in place of the hand crank but this knob does not have a sleeve that is long enough to engage the projection 147 on the bar 144 and hence the full stroke pawl is not enabled.

It is to be understood that the structure shown is for purposes of illustration only and that variations may be made in it without departing from the spirit and scope of the invention as defined by the appended claims.

I claim:

1. A calculating machine having an oscillatory operating shaft, an electric motor, an oscillatory planetary transmission between said motor and operating shaft, a single manipulative means for conditioning said transmission to oscillate said shaft and to start said motor, and means for automatically disabling said transmission and stopping said motor after said operating shaft has been moved a predetermined distance.

2. A calculating machine having a main operating shaft adapted to be rocked a predetermined distance to give the machine a stroke of operation, means for returning said shaft to normal, an electric motor, a planetary transmission between said motor and shaft, means for conditioning said transmission to cause the motor to rock the shaft, and means for disabling said transmission when said shaft has been rocked a predetermined distance, said planetary transmission being returned to normal by the return of said operating shaft to normal.

3. A calculating machine having a main operating shaft, an electric motor driving a worm shaft, a worm gear meshing with said worm shaft and driving a sun gear, a plurality of planet gears meshing with said sun gear, means connected to said operating shaft for supporting said planet gears, an annular internal gear meshing with said planet gears, said annular gear having notches in its outer periphery, manipulative means for engaging said notches to arrest said annular gear to cause said motor to drive said operating shaft, and means for automatically freeing said annular gear for rotation after said operating shaft has moved a predetermined distance.

4. A calculating machine having a main operating shaft adapted to be rocked a predetermined distance in one direction, means for returning said shaft after it has been rocked, an electric motor driving a worm shaft, a worm gear meshing with said worm shaft and driving a sun gear, a plurality of planet gears meshing with said sun gear, an annular internal gear meshing with said planet gears, supporting means for said planet gears connected with said operating shaft, manipulative means for arresting movement of said annular gear to cause said drive shaft to be rocked by said motor, and means for freeing said annular gear after said operating shaft has moved a predetermined distance, said planet gears being returned to normal position by the return of said operating shaft to normal.

5. A calculating machine having a main operating shaft, an electric motor, a planetary transmission between said motor and shaft, a starting switch for the motor, manipulative means for conditioning said transmission to drive said shaft and for closing said switch to start the motor, means for automatically disabling said transmission and for opening said switch when said operating shaft has been rocked a predetermined distance, and means conditioned by a sudden and incomplete manipulation of said manipulative means for conditioning said manipulative means to enable it by a second complete manipulation to close the switch to start the motor and to condition said transmission for operation even though said prior incomplete manipulation may have placed the parts in abnormal condition.

In testimony whereof, I have subscribed my name.

ALLEN A. HORTON.